No. 826,899. PATENTED JULY 24, 1906.
H. E. SMALLBONE.
DRIVING BELT.
APPLICATION FILED JAN. 29, 1906.
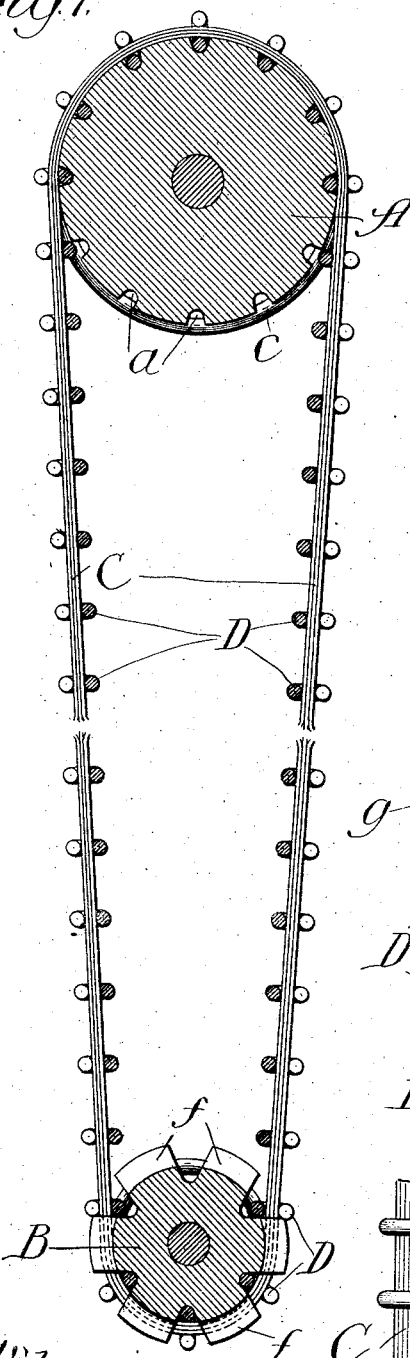
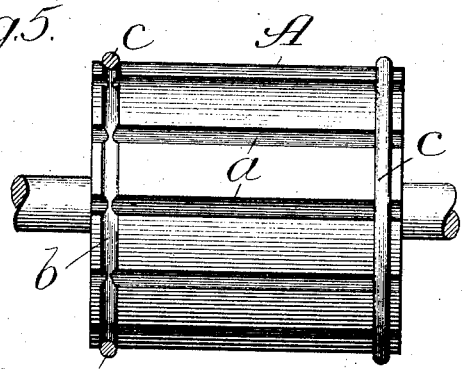
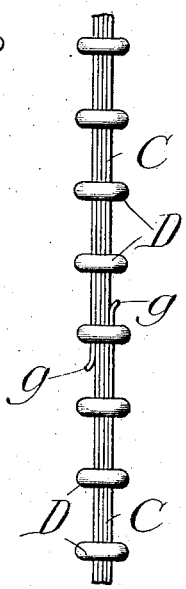
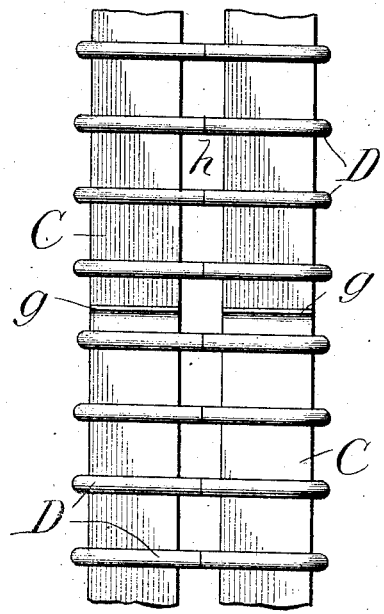
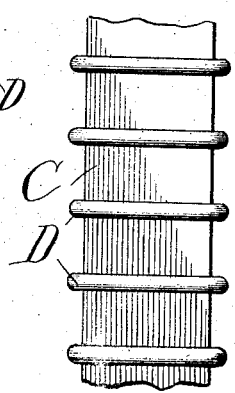
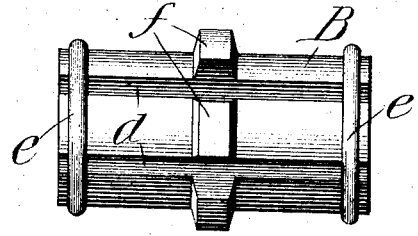
Witnesses:
Inventor:
Harry E. Smallbone,
By Dyrenforth, Dyrenforth & Lee,
Attys.

UNITED STATES PATENT OFFICE.

HARRY E. SMALLBONE, OF CHICAGO, ILLINOIS.

DRIVING-BELT.

No. 826,899.

Specification of Letters Patent.

Patented July 24, 1906.

Application filed January 29, 1906. Serial No. 298,407.

*To all whom it may concern:*

Be it known that I, HARRY E. SMALLBONE, a citizen of the United States, residing at Chicago, in the county of Cook and State of Illinois, have invented a new and useful Improvement in Driving-Belts, of which the following is a specification.

My invention relates, generally stated, to improvements in driving-belts for use in sewing-machines and other mechanical devices wherein a comparatively narrow belt must be employed to drive one rotating part from another without danger of slipping, so that the parts will operate in exact unison.

My invention relates more particularly to improvements in driving-belts for the above purpose in which an endless inelastic or approximately inelastic web forming a flexible band is provided at regular intervals throughout its extent, with transverse wires bent into oblong shape and clamped to the web in proper spaced relation to register with and engage transverse peripheral sockets in the shafts or pulleys forming the driving and driven parts with which the belt coöperates.

Hitherto it has been the practice to form the band or belt body of a single length of substantially inelastic cord wound in successive spirals or coils, which extend side by side throughout the width of the belt. A belt of this type is shown in Letters Patent No. 667,830, granted to A. Steward February 12, 1901, and it has been found in practice that the strain upon the outer coils, more especially near the terminals of the cord, tends to draw upon and shift the adjacent clips or clamps in such a way as to cause them to extend slantingly with reference to a right angle to the length of the belt, and thereby throw them out of register with the sockets in the shafts or pulleys which they are intended to engage. Thus it frequently happens that in a comparatively short time such belts become useless, as in failing to engage the sockets in the driving and driven parts they permit sufficient slip between them to destroy the necessary exact unison.

My object is to overcome the difficulties experienced with belts of this class hitherto in use by providing the endless band or belt body of preferably a single length of inelastic or substantially inelastic linen tape or the like, wound upon itself to produce a band of the desired thickness and of laminated form, the layers being held together by means of clips or clamps, secured to the laminated band and spaced apart in proper relation to register with grooves in pulleys or the like, with which the belt is intended to coöperate.

Referring to the drawings, Figure 1 is a broken sectional view showing a pair of shafts and pulleys thereon driven one from the other by means of a laminated belt of my improved construction; Fig. 2, an enlarged fragmentary view showing a portion of the belt adjacent to the ends of the tape; Fig. 3, a broken fragmentary view of what I term a "single" belt of my improved construction; Fig. 4, a similar view of the under side of what I term a "double" belt of my improved construction; Fig. 5, a broken view, partly in section, of the larger pulley of a pair adapted to coöperate with the belt shown in Fig. 4; and Fig. 6, a side elevation of the small pulley of a pair adapted to coöperate with the belt shown in Fig. 4.

A is a driving-pulley, and B a driven pulley, such as I prefer to provide in sewing-machines, especially where I employ a double belt formed as shown in Figs. 2 and 4. The pulley A is provided with transversely-extending peripheral sockets $a$, equidistant apart and intersected near opposite ends of the pulley by circumferential grooves or sockets $b$. The grooves $b$ are fitted with rings $c$, forming flanges close to the ends of the pulley. The smaller pulley B is also provided with transversely-extending peripheral sockets $d$, coinciding in distance apart with the sockets $a$. The sockets $d$ are intersected near their opposite ends by grooves or sockets to receive rings $e$, forming, in effect, the pulley-flanges. In the spaces between sockets $b$ midway between the rings $e$ are teeth $f$, as shown.

The single-belt body C is formed of one length of inelastic or substantially inelastic fabric or tape wound upon itself to present a plurality of layers, preferably of the same width. The layers are clamped together by means of wire clamps or sprocket-wheel-engaging bars D of oblong form and preferably abutting at their ends at the center of one face of the belt, as indicated. The clamps D are equidistant apart, the distance between them corresponding exactly with that between the sockets $a$ and sockets $b$. The tape terminates at opposite sides of one of the clamps D, the tape ends being shown at $g$ in Figs. 2 and 4. The clamps are so applied as to obtain a tight hold upon the belt and squeeze the layers firmly against each other.

The endless belt may be formed of three layers of the tape, as shown in Fig. 1, of four layers, as shown in Fig. 2, or, in fact, of any desired number of layers. The single belt (shown in Fig. 3) may be employed with pulleys, neither of which is provided with central teeth $f$. The double belt (shown in Figs. 1 and 4) consists of two similar comparatively narrow laminated bands, formed as described and placed apart in parallel relation to leave the central line of spaces $h$ between the clamps D, which thus form teeth, the said spaces being just sufficiently large to receive the teeth $f$ of the pulley B.

It is not uncommon in sewing-machines to rotate the larger pulley at four thousand five hundred and the smaller pulley at nine thousand or even thirteen thousand five hundred revolutions per minute. Such high speed renders it inadvisable in practice to rely alone upon engagement of the clamps D with the sockets $d$. By providing the teeth $f$ on the smaller pulley and a double belt with the spaces $h$ all danger of slipping between the driving and driven parts is thus overcome. As all the layers of the belt are of the same width and of the same strength throughout, the strain is equally distributed across its width, and there is no danger of shifting of the clamps from their position at right angles to the length of the belt. In the event that the belt becomes loose from any cause the teeth $f$ will prevent its "jumping" or failing to register at the clamps with the sockets $d$. The teeth also make it possible to employ a belt of less tension than would otherwise be necessary, thus relieving strain upon the shafts. If desired, the larger pulley A may also be formed with teeth $f$. The sockets $a$ and $d$ naturally engage only the inner sides or lengths of the clamps D, tending to turn them on axes at right angles to the length of the belt, with consequent danger of permitting them to slip upon the pulleys. The teeth $f$, however, mesh with and engage both the upper and lower lengths of the clamps, and thus overcome the danger.

What I claim as new, and desire to secure by Letters Patent, is—

1. A driving-belt, of the character described, comprising, in combination, a substantially inelastic woven-fabric tape wound upon itself to produce a flexible laminated endless band, and a series of transverse uniformly-spaced clamps of oblong shape bent around the said band and compressed thereon to hold the laminæ together and form sprocket-wheel-engaging bars.

2. A driving-belt, of the character described, comprising, in combination, a pair of similar, substantially inelastic woven-fabric tapes, each wound upon itself to produce a flexible laminated endless band, and a series of transverse uniformly-spaced clamps of oblong shape bent around the said bands and compressed thereon to hold the laminæ together and the bands apart in parallel spaced relation and form the sprocket-wheel-engaging bars.

HARRY E. SMALLBONE.

In presence of—
J. H. LANDES,
M. S. MACKENZIE.